US008645175B1

(12) United States Patent
Arbogast

(10) Patent No.: US 8,645,175 B1
(45) Date of Patent: Feb. 4, 2014

(54) WORKFLOW SYSTEM AND METHOD FOR SINGLE CALL BATCH PROCESSING OF COLLECTIONS OF DATABASE RECORDS

(75) Inventor: Emmanuel Arbogast, Newcastle, WA (US)

(73) Assignee: Open Text S.A., Luxembourg (LU)

( * ) Notice: Subject to any disclaimer, the term of this patent is extended or adjusted under 35 U.S.C. 154(b) by 1656 days.

(21) Appl. No.: 11/486,398

(22) Filed: Jul. 12, 2006

Related U.S. Application Data

(60) Provisional application No. 60/698,678, filed on Jul. 12, 2005, provisional application No. 60/698,700, filed on Jul. 12, 2005.

(51) Int. Cl.
*G06Q 10/00* (2012.01)

(52) U.S. Cl.
USPC .......................................... 705/7.11

(58) Field of Classification Search
USPC ................................. 705/7.11, 7.26
See application file for complete search history.

(56) References Cited

U.S. PATENT DOCUMENTS

| | | | |
|---|---|---|---|
| 5,339,423 A | 8/1994 | Beitel et al. | |
| 5,649,220 A * | 7/1997 | Yosefi | 715/201 |
| 5,966,512 A | 10/1999 | Bates et al. | |
| 5,974,418 A | 10/1999 | Blinn et al. | |
| 6,196,393 B1 * | 3/2001 | Kruk et al. | 209/630 |
| 6,249,291 B1 | 6/2001 | Popp | |
| 6,330,006 B1 | 12/2001 | Goodisman | |
| 6,339,838 B1 | 1/2002 | Weinman, Jr. | |
| 6,415,259 B1 | 7/2002 | Wolfinger et al. | |
| 6,429,880 B2 | 8/2002 | Marcos et al. | |
| 6,430,538 B1 * | 8/2002 | Bacon et al. | 705/9 |
| 6,437,805 B1 | 8/2002 | Sojoodi et al. | |
| 6,442,563 B1 * | 8/2002 | Bacon et al. | 1/1 |
| 6,484,150 B1 | 11/2002 | Blinn et al. | |
| 6,493,731 B1 * | 12/2002 | Jones et al. | 715/234 |
| 6,553,563 B2 | 4/2003 | Ambrose et al. | |
| 6,621,505 B1 * | 9/2003 | Beauchamp et al. | 715/764 |
| 6,745,221 B1 | 6/2004 | Ronca | |
| 6,860,422 B2 * | 3/2005 | Hull et al. | 235/376 |
| 6,874,146 B1 | 3/2005 | Iyengar | |
| 6,904,412 B1 * | 6/2005 | Broadbent et al. | 705/38 |
| 6,968,503 B1 * | 11/2005 | Chang et al. | 715/202 |
| 6,975,914 B2 * | 12/2005 | DeRemer et al. | 700/96 |
| 6,990,654 B2 | 1/2006 | Carroll, Jr. | |
| 7,017,123 B2 | 3/2006 | Chickles et al. | |
| 7,076,728 B2 * | 7/2006 | Davis et al. | 715/205 |

(Continued)

FOREIGN PATENT DOCUMENTS

WO WO 2004/012109 A1 2/2004

OTHER PUBLICATIONS

Captaris Announces Teamplate for .Net 4.1 CMSWire, Apr. 4, 2004.*
Captaris Workflow, powered by Teamplate Captaris, 2005.*

(Continued)

*Primary Examiner* — Scott L Jarrett
(74) *Attorney, Agent, or Firm* — Sprinkle IP Law Group

(57) ABSTRACT

Vector-based record handling by a workflow facility may be performed in association with performing a step from a workflow model that requires more than one input. The workflow facility retrieves the records needed to complete the step as a collection of records comprising a single input unit. Various components of the workflow facility, including components that operate within a runtime environment provided by the facility, perform processing of the collection of records so that the step from the workflow model can be completed.

16 Claims, 8 Drawing Sheets

(56) References Cited

U.S. PATENT DOCUMENTS

| | | | |
|---|---|---|---|
| 7,124,373 B1 | 10/2006 | Patil | |
| 7,127,716 B2* | 10/2006 | Jin et al. | 718/105 |
| 7,134,090 B2 | 11/2006 | Kodosky et al. | |
| 7,143,343 B2* | 11/2006 | Bender et al. | 715/241 |
| 7,159,185 B1 | 1/2007 | Vedula et al. | |
| 7,161,108 B2* | 1/2007 | O'Connell et al. | 209/584 |
| 7,194,692 B2 | 3/2007 | Marcos et al. | |
| 7,194,737 B2* | 3/2007 | Amodio et al. | 717/173 |
| 7,321,864 B1* | 1/2008 | Gendler | 705/7 |
| 7,426,548 B2* | 9/2008 | Griffin et al. | 709/219 |
| 7,428,495 B2* | 9/2008 | Dhar et al. | 705/8 |
| 7,483,902 B2* | 1/2009 | Ghai et al. | 1/1 |
| 7,500,185 B2* | 3/2009 | Hu | 715/235 |
| 7,539,982 B2* | 5/2009 | Stuart | 717/140 |
| 7,634,756 B2* | 12/2009 | Bjornson et al. | 717/107 |
| 7,640,548 B1* | 12/2009 | Yu et al. | 718/106 |
| 7,788,214 B2* | 8/2010 | Fernandez et al. | 707/602 |
| 7,917,888 B2* | 3/2011 | Chong et al. | 717/102 |
| 7,945,093 B2* | 5/2011 | Fowler | 382/167 |
| 8,082,169 B2* | 12/2011 | Crew et al. | 705/7.26 |
| 8,090,612 B2* | 1/2012 | Chao et al. | 705/7.29 |
| 8,429,527 B1 | 4/2013 | Arbogast | |
| 2001/0045963 A1 | 11/2001 | Marcos et al. | |
| 2002/0007405 A1* | 1/2002 | Bahadur | 709/218 |
| 2002/0029376 A1 | 3/2002 | Ambrose et al. | |
| 2002/0085020 A1 | 7/2002 | Carroll | |
| 2002/0165912 A1 | 11/2002 | Wenocur et al. | |
| 2003/0093433 A1 | 5/2003 | Seaman et al. | |
| 2003/0093755 A1 | 5/2003 | O'Carroll et al. | |
| 2004/0003353 A1* | 1/2004 | Rivera et al. | 715/530 |
| 2004/0006598 A1 | 1/2004 | Bargagli Damm et al. | |
| 2004/0078258 A1* | 4/2004 | Schulz et al. | 705/9 |
| 2004/0088647 A1* | 5/2004 | Miller et al. | 715/500 |
| 2004/0127279 A1* | 7/2004 | Gatto et al. | 463/17 |
| 2004/0236835 A1* | 11/2004 | Blankenship | 709/206 |
| 2004/0250213 A1 | 12/2004 | Shalabi et al. | |
| 2005/0015746 A1 | 1/2005 | Shukla et al. | |
| 2005/0066287 A1 | 3/2005 | Tattrie et al. | |
| 2005/0066304 A1 | 3/2005 | Tattrie et al. | |
| 2005/0102608 A1 | 5/2005 | Batres | |
| 2005/0114405 A1* | 5/2005 | Lo | 707/200 |
| 2005/0216830 A1 | 9/2005 | Turner et al. | |
| 2005/0262429 A1 | 11/2005 | Elder et al. | |
| 2005/0262430 A1 | 11/2005 | Croft | |
| 2005/0273272 A1* | 12/2005 | Brando et al. | 702/19 |
| 2006/0004827 A1* | 1/2006 | Stuart | 707/102 |
| 2006/0047665 A1 | 3/2006 | Neil | |
| 2006/0259524 A1* | 11/2006 | Horton | 707/201 |
| 2006/0282473 A1* | 12/2006 | Horrocks et al. | 707/200 |
| 2007/0192402 A1* | 8/2007 | Dean et al. | 709/202 |
| 2008/0012525 A1 | 1/2008 | Lin | |
| 2008/0189679 A1 | 8/2008 | Rodriguez et al. | |
| 2008/0275907 A1 | 11/2008 | Han et al. | |
| 2008/0278740 A1 | 11/2008 | Bird et al. | |
| 2010/0070945 A1 | 3/2010 | Tattrie | |

OTHER PUBLICATIONS

Captaris Workflow Tehnical Overview Captaris, 2005.*
Chen, Qiming et al., Multi-Agent Cooperation, Dynamic Workflow and XML for E-Commerce Automation HP Laboratories, Oct. 1999.*
Wang, Alf Inge, Experience paper: Using XML to implement a workflow tool NTNU, Trondheim Norway, Apr. 4, 2001.*
Tripathi, Anand R., Implementing Distributed Workflow Systems from XML Specifcations 2000.*
Filho, Roberto Silveria Silva et al., A Fully Distributed Architecture for Large Scale Workflow Enactment International Journal of Cooperative Information Systems, 2003, vol. 12; No. 4.*
Dr. Michael Kay, Building Worflow Applications with XML and XQuery DataDirect Technologies, Inc. 2006.*
Shegalov, German et al., XML-enabled workflow management for e-services across hetergeneous platforms The VLDB Jourhnal, vol. 10, 2001.*
Stauch, Marc et al., Design and Implementation of an XSL-T and XML-based Workflow System XML Europe, 2001.*
Alchemy Workflow Solutions—Datasheet Captaris, 2005.*
Doculabs MarketFocus White Paper: ANalysis of the Captaris Solution for Fixed Content Management Doculabs, 2005.*
Nexant Automates Energy Efficiency with Captaris Workflow Captaris 2005.*
TrackWise—User's Guide Sparta SYstems, Inc., 2000.*
Teamware Flow 3.1 User's Guide TeamWARE Group, Apr. 2000.*
Marchetti, Andrea et al., XFlow: An XML-Based Document Centric Workflow WISE 2005, LNCS, 2005.*
Krishnan, Rupa e tal., XDoc-WFMS: A Framework for Document Centric Workflow Management Lecture Notes in Computer Science, 2002, vol. 2465/2002, 348-362.*
Arpinar, Ismailcem Budak et al., An Efficient Data Extraction and Storage Utility for XML Documents Proceedings of the 39th Annual ACM Southeast Conference, 2001.*
IBM DB2: Administering XML Extender (IBM DB2 Help Manual) IBM, 2006.*
Wang, Alf Inge, Experience paper: Using XML to implement a workflow tool Norwegian University of Science and Technology, Nov. 21, 2002.*
Berlea, Alexnadru et al., fxt—A Transformation Language for XML Documents Jounral of Computing and Information Technology, vol. 10, 2001.*
Hsiao, Hui-I, Advanced Technology for Managing XML Document Collections IEEE, 2005.*
Song, Minrong et al., REPOX: An XML Repository for Workflow Design and Specifcations Aug. 26, 2001.*
Eder, JJohann et al., Composition of Transformations for XML Schema Based Documents Proceedings of Short Papers of the 7th East European Conference on Advances in Databases and Information Systems, 2003.*
Workflow Management Coalition Worfklow Standard—Interopability Wf-XML Bidning The Workflow Management Coalition, May 1, 2000.*
Doucent, Antoine et al., Accurate Retrieval of XML Document Fragments Using EXTIRP INEX 2003 Workshop Proceedings, 2003.*
Tennison, Jeni, Processing XML Documents with Pipelines DocEng'06, 2006.*
XML Pipeline definition Wikipedia.org, Retrieved Mar. 16, 2012.*
Rossi, Davide, Orchestrating Document-based Workflows with X-Folders 2004 ACM Symposium on Applied Computing, 2004.*
Page, Sam, XSL Pipeline Processing UsingXML, 2005.*
Pediaditakis, Michael et al., Device neutral pipelined processing of XML documents WWW2003, 12th International World Wide Web Conference, 2003.*
Bae, Hyerim et al., A document-process association model for workflow management Computers in Industry, vol. 47, 2002.*
Dan et al., "Web services on demand: WSLA-driven automated management," IBM Systems, Journal, vol. 43, No. 1, 2004, pp. 136-158.
International Search Report and Written Opinion; International Patent Application No. PCT/US07/68825; Filed May 11, 2007; Applicant; Captaris, Inc.; Mailed: Jul. 17, 2008; 12 pages.
Office Action issued in U.S. Appl. No. 11/486,397, mailed Mar. 10, 2010, 22 pages.
LeVitus, et al., "MacWorld Microsoft Office 2001 Bible," IDG Books Worldwide, Inc., 2001, pp. 163-178.
Office Action issued in U.S. Appl. No. 11/486,397, mailed Aug. 13, 2010, 16 pages.
Office Action issued in U.S. Appl. No. 10/938,118, mailed Oct. 29, 2007, 32 pages.
Office Action issued in U.S. Appl. No. 10/938,118, mailed May 14, 2008, 27 pages.
Office Action issued in U.S. Appl. No. 10/938,118, mailed Jan. 14, 2009, 21 pages.
Castellanos, et al., "IBOM: A Platform for Intelligent Business Operation Management," Proceedings of the 21st International Conference on Data Engineering, 2005, pp. 1-12.
Continuous Business Process Management with HOLOSOFX BPM Suite and IBM MQSeries Workflow, ibm.com/redbooks, May 2002, p. 1-534.

(56) References Cited

OTHER PUBLICATIONS

Gannon, et al., "A Quick Tour of LEAD via LEAD Portal & Application Orchestration," Indiana University, Jul. 21-22, 2005, p. 1-46.

Schmidt, "Building Workflow Business Objects," OOPSLA '98 Business Object Workshop IV, 1998, p. 1-14.

Senkul and Torosola, "An Architecture for Workflow Scheduling Under Resource Allocation Constraints," Information Systems 30 (2005), p. 399-422.

Office Action issued in U.S. Appl. No. 10/938,118, mailed Nov. 3, 2009, 17 pages.

Examiner's Report for Canadian Patent Application No. 2,443,454, mailed Jan. 25, 2011, 6 pgs.

Examiner's Report for Canadian Patent Application No. 2,451,164, mailed Feb. 16, 2011, 4 pgs.

Office Action for U.S. Appl. No. 11/486,397, mailed Feb. 2, 2012, 14 pgs.

Office Action for U.S. Appl. No. 12/396,445, mailed Mar. 13, 2012, 14 pgs.

Office Action for U.S. Appl. No. 10/938,118, mailed May 8, 2012, 38 pgs.

Office Action for U.S. Appl. No. 11/486,397, mailed Jun. 6, 2012, 9 pgs.

Notice of Allowance issued for U.S. Appl. No. 11/486,397, mailed Dec. 21, 2012, 7 pages.

Primary and Foreign Key Constraints retrieved from http://msdn.microsoft.com/en-us/library/ms179610(d=printer).aspx on Sep. 6, 2012, 5 pages.

Michelle A. Poolet, "SQL by Design: How to Choose a Primary Key" dated Apr. 1, 1999, retrieved from http://www.sqlmag.com/print/systems-administrator/sql-by-design-how-to-choose-a-primary-key, 4 pages.

* cited by examiner

WORKFLOW SYSTEM AND METHOD FOR SINGLE CALL BATCH PROCESSING OF COLLECTIONS OF DATABASE RECORDS

CROSS-REFERENCE TO RELATED APPLICATIONS

This application claims priority to U.S. Provisional Patent Application No. 60/698,678 filed Jul. 12, 2005, entitled "COMPLEX DATA MERGING, SUCH AS IN A VECTOR-BASED WORKFLOW APPLICATION," and U.S. Provisional Patent Application No. 60/698,700, filed Jul. 12, 2005, entitled "WORKFLOW SYSTEMS."

BACKGROUND

Workflow technologies are often used to manage and monitor business processes. For example, workflow technologies allow users to efficiently define and track processes that involve work spanning multiple individuals and/or departments within an organization (or even across organizations). Existing workflow technologies often allow users to automate a range of tasks, which are often dependent on large amounts of specific information. Accordingly, executing a task may involve performing functions (sometimes repeatedly) on large sets of input data.

In general, tasks are created to perform a single or limited set of functions and then combined with other tasks as part of larger processes. Some high-level examples of task functions include retrieving data from a data store, retrieving data from an external application, sending data to a data store, sending data to an external application, re-formatting input data to output data, transforming (computing) data from input to output, deriving new data from input data, relating multiple input streams of data with respect to each other, etc. As a practical example, workflow tasks may be responsible for notifying employees of pending work orders. Likewise, workflow tasks may enable managers to efficiently observe status and route approvals quickly.

Because the demand for workflow technology is high, there are many types of workflow technologies on the market. Most workflow technologies are generally comprised of a package of several software components that provide functionality in areas of both workflow design and workflow execution. In terms of workflow design, these software components sometimes include workflow diagramming functionality having a workspace or canvas used to create workflow diagrams (e.g., specify the placement of tasks and pipes, which define the sequence and flow of information between tasks in a workflow). In facilitating workflow design, the software components of workflow technologies often allow a user to specify parameters and business rules to guide the flow of control, the flow of data, and the functions of tasks. In addition to facilitating the design of workflows, the software components of typical workflow technologies also facilitate the initiation, evaluation, and review of workflows (sometimes called "workflow models").

In terms of executing workflows, typical workflow technologies include processing capabilities that manage the flow of information along the pipes between tasks, apply business rules to direct the execution path and data at pipe junctions, ensure data is passed as input to tasks, ensure user parameter metadata is provided to tasks, monitor and propagate error status of the tasks and pipes, and save and restore job context between sessions. However, existing workflow technologies are often limited in the way that they execute tasks. For example, they typically operate by reading input data one record at a time (with each record limited to similarly shaped data), applying a task (function) to the data, and outputting modified data after performing the task, one record at a time. In other words, in most workflow systems, each task within a workflow inputs, processes, and outputs a single record prior to processing a subsequent record. In such systems, scalability is achieved by invoking parallel instances of a task, although each instance still incurs the individual memory and computational overhead.

Figure 1:
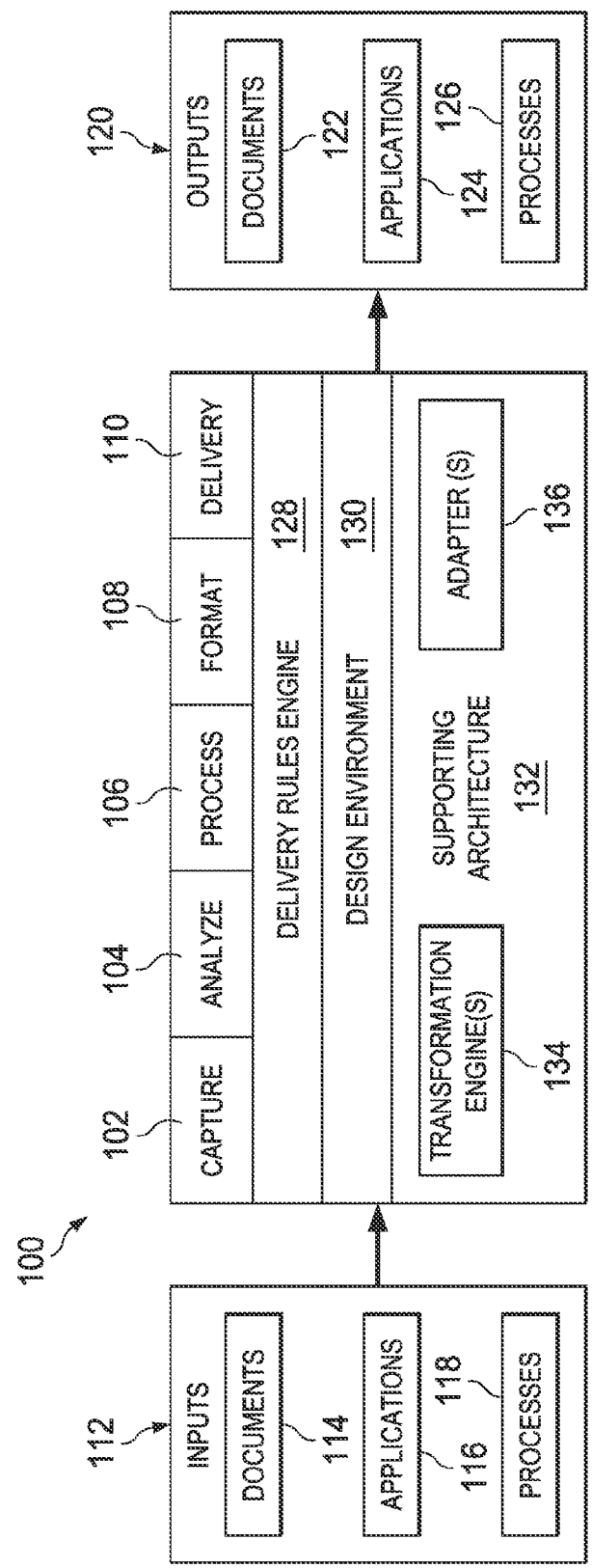
FIG. 1 is a block diagram showing an example of an environment in which a workflow facility having vector-based characteristics may be implemented.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

I. Overview

A software system or facility allows for the efficient creation and management of workflows and other customizable processes that define a sequence of tasks or steps performed to reach a common goal (e.g., a common business goal). Each of these tasks or steps is typically dependent on information that the workflow application imports, derives, modifies, or exports. For example, to complete a task or step, the workflow facility may access input needed to complete the task, perform processing on the input (which may include applying rules, performing calculations or data manipulations, or executing processes dependent on the input), and then, where appropriate, produce an output relating to the task or step (or possibly an output that may be used in completing a subsequent task or step).

Execution of a task or step may depend on the workflow facility having the capability to perform processing on multiple records for the purpose of creating new data for delivery as output. To further this purpose, the workflow facility described herein is configured to handle a single input unit comprising an entire collection (or vector) of records (in addition to being able to handle input comprising only a single record). This vector-based record handling functionality is integrated into the infrastructure of the workflow application architecture. For example, the workflow facility may invoke a workflow action in association with performing a task or step. This single invocation of the workflow action operates within a runtime environment provided by the workflow facility. Because it is configured to access and work on vectors/collections of records (as well as single records), only a single invocation of the workflow action is needed to execute a task or step. This prevents the workflow facility from incurring the overhead associated with invoking multiple instances of a workflow action to complete a task or step that relies on a collection of records for its execution. Further, the vector-based design of the workflow facility does not require recoding or the like to achieve scalability.

Various components of the workflow facility, including components that operate within a runtime environment provided by the facility, perform processing of the collection of records so that the step from the workflow model can be completed. An example of such a component is an adapter module, which communicates with an invoked workflow action. The adapter module may have both a data handling component (e.g., a connector proxy) and a data processing component (e.g., a device connector). In some embodiments, the data handling component receives/retrieves units of input (e.g., each comprising a collection of records), receives metadata parameters, manages queues of processing requests, and manages the parsing of a collection of records into a set of individual records. The data processing component performs a specialized function/task on a given data set (e.g., a single record).

II. Example System Architecture

FIG. 1 is a block diagram showing an example of a system environment 100 in which aspects of the workflow facility, which is configured for vector-based records handling, can be implemented. The system environment 100 may include various components, thereby allowing the workflow facility to perform various processes. Examples of such processes may include information capture processes 102, information analysis processes 104, information processing processes 106, information formatting processes 108, information delivery processes 110, etc.

The workflow facility's information capture processes 102 are used to retrieve information for use by the workflow facility in performing various actions. In particular, the workflow facility's information capture processes are equipped to handle vector-based input comprising collections of records. Such collections may typically be expressed in the form of document schema written in XML. Table A below shows an example of an XML schema for two XML documents. Table A is derived from the XML schema and record types for each document. In this example, <invoices> and <users> are the record types, respectively. Each column conforms to a specific record type derived from the XML schema for each document.

TABLE A

| | |
|---|---|
| <invoices> | <users> |
|   <invoice> |   <user> |
|     UserID + Invoice data |     UserID + user data |
|   </invoice> |   </user> |
|   <invoice> |   <user> |
|     UserID + Invoice data |     UserID + user data |
|   </invoice> |   </user> |
| . . . | . . . |
| </invoices> | </users> |

Table B below illustrates an XML output schema. The left-hand column of the table shows the output schema when the customer XML document is the parent document and the right-hand column of the table shows the output schema when the invoices XML document is the parent. InvoiceData and UserData are the contents of the <invoice> and <user> elements, respectively. Such contents may themselves be elements or text, depending on the hierarchy described by the schema.

TABLE B

| User is the parent record: | Invoice is parent record: |
|---|---|
| <user> | <invoice> |
|   InvoiceData |   UserData |
|   InvoiceData | </invoice> |
|   . . . | <invoice> |
| </user> |   UserData |
| <user> | </invoice> |
|   . . . | . . . |
| </user> | |
| . . . | |

In some embodiments involving the merging of information from more than two input components that form hierarchical relationships, the workflow facility identifies relationships among the input components having contents to be merged using a single root/parent document that defines a top-level sequence. In such cases, aside from the parent document, any subsequent documents involved in the merge are directly or indirectly children of the parent. The children may define their relationships with only their closest parent. Multiple children may share the same parent, but a child does not have a direct relationship with a grandparent. To illustrate this using the XML documents from the example given in Table B, the customer information includes a city ID. The city information may then be obtained from another XML document with city records (also having a city ID field). However, in this particular example, the joining of this information may be independent of the joining of the invoice information with the customer information.

Other sample cases include the following: In the case where only one input is used, there is no join involved since the single document is the root document. Where two documents are related purely by the order of the records in the document, it may be possible to use an implicit key relationship comprising the row number, even though the row number is not an explicit field in either record. The workflow facility may also use literal/scalar values instead of collections where a value is replicated as often as needed (e.g., a single message to be sent to all recipients of a notification). Other samples of schema that may be produced by the workflow facility are shown in Tables C and D below. In particular, Tables C and D show examples of XML that is passed from a custom action to an adapter (components of the workflow facility that are described in more detail with respect to FIG. 2). Table C shows an example of XML for a single input document.

TABLE C

```
<!-- Single Input – Invoices as Document -->
<JobRequestParameters>
    <OutputDestination>C:\folder</OutputDestination>
    <ReportFormat>PDF</ReportFormat>
    <OutputPrefix>FileName</OutputPrefix>
</JobRequestParameters>
<TaskParameters>
    <TaskParameter taskParameterID="43493fecf">
        UserID + Invoice data
    </TaskParameter>
    <TaskParameter taskParameterID="63495fefa">
        UserID + Invoice data
    </TaskParameter>
    . . .
</TaskParameters>
```

Table D shows an XML example of two input documents that have been joined.

TABLE D

```
<!-- Merged Input – Invoices as Parent Document, Users as Child Document -->
<JobRequestParameters>
    <OutputDestination>C:\folder</OutputDestination>
    <ReportFormat>PDF</ReportFormat>
    <OutputPrefix>FileName</OutputPrefix>
</JobRequestParameters>
<TaskParameters>
    <TaskParameter taskParameterID="83c93cecf">
        UserID + Invoice data + user data
    </TaskParameter>
    <TaskParameter taskParameterID="13c93c6ce">
        UserID + Invoice data + user data
    </TaskParameter>
    . . .
</TaskParameters>
```

More generally, in performing information capture processes 102, the workflow facility may identify and capture content from various input sources 112 which may include common business applications e.g., (systems such as Great Plains software, SAP applications, etc.). Examples of content captured from the input sources 112 include documents 114, applications 116, and processes 118. In general, the workflow facility is configured to capture both content that is internal to the workflow facility and content that is external to the workflow facility and to represent it in a form, such as an XML document schema, for processing by the workflow application.

The workflow facility's information analysis processes 104 are used to manage and organize captured information so that the captured information can be handled most appropriately by the workflow facility during processing. For example, in performing information analysis processes 104, the workflow facility may identify or categorize the captured content (e.g., identify it as a purchase order, an invoice, etc.) and then associate the content with an appropriate business process. Accordingly, the information analysis processes 104 allow the workflow facility to effectively handle a wide variety of content and data. In some embodiments, the information analysis processes 104 are implemented using one or more transformation engines 134 (shown as part of a supporting architecture 132), which perform processing associated with data analysis, data relationship rule application, sorting, filtering, data manipulation, etc.

The workflow facility's information analysis processes 104 are often followed by processing processes 106. The processing of captured content using the processing processes 106 may include transforming aspects of data from the captured content into a standard format such as XML. As described in more detail with respect to FIG. 2, when dealing with vector-based inputs (e.g., collections of records vs. single records), the processing processes may be implemented, at least in part, via the use of one or more adapter components. In some embodiments, the processing processes 106 are implemented using one or more adapters 136 (shown as part of the supporting architecture 132).

To allow delivery of different types of output to different types of systems, output resulting from the processing processes 106 may be formatted by one or more formatting processes 108. For example, the formatting processes 108 may use a template approach to format output data so that it conforms to an external system or so that it meets fidelity and quality requirements for a particular delivery method to be used.

The workflow facility may rely on delivery processes 110 that allow formatted output to be delivered to an intended recipient. Such delivery processes 110 may be associated with various delivery methods (e.g., fax, email, print, web (HTML, XML), wireless (SMS for mobile devices), etc.). The delivery processes 110 may be configured to work with technologies capable of high-volume, simultaneous multi-channel delivery, making communication with customers, partners, suppliers, and employees more personalized and cost-effective. For example, one delivery process may be associated with automatically sending out large number of emails or faxes in single batches. In some embodiments, delivery may include delivery to a process or even delivery to a data store.

The vector-based workflow processing performed by the workflow facility, which is described in more detail with respect to FIGS. 4-9, may rely on a combination of the processes described above (102-110). The various components that make up the workflow facility and enable it to perform various processes, including the processes described above (102-110), include a delivery rules engine 128, a design environment 130, and various aspects of supporting architecture 132. For example, the delivery rules engine 128 performs tasks associated with data acquisition and identification, functional processing, output preparation, formatting, and delivery. Accordingly, the delivery rules engine 128 may provide support for many of the processes associated with the workflow facility, including intelligent routing between the information capture processes 102, the information analysis processes 104, the information processing processes 106, the information formatting processes 108, and the information delivery processes 110. Examples of different types of output data that result from the workflow facility's processing processes 106 include documents 122, applications 124, and processes 126.

The design environment 130 generally serves as an interface for administrators of the workflow facility (including both software developers and individuals with more basic programming skills). For example, the design environment provides various design, management, reporting, and administration tools/functionality. The features of the design environment 130 may enable developers to open an existing model, start with a blank model design canvas, or optionally use a predefined model created externally (e.g., a Visio diagram) to start development. In this way, administrators can customize the workflow facility for the needs of a particular organization. The creation of a workflow model may include designing custom actions to be performed by the workflow facility, designing custom end-user interfaces, and specifying custom input sources 112 and outputs 120. The design environment 130 may also provide aspects of one or more end-user interfaces that are configured for users who do not have programming skills.

An underlying supporting architecture 132 provides a hardware and software framework for implementing the facility. An example implementation of the supporting architecture 132 is described in more detail with respect to FIG. 2, which is a block diagram showing various sample implementation details for the supporting architecture 132 of FIG. 1. In particular, FIG. 2 focuses on aspects of the supporting architecture used during runtime while processing tasks using vector-based inputs (collections of records).

One runtime-based component of the supporting architecture 132 includes a workflow action 202. The workflow action 202 may be implemented via a segment of executable code that, for example, runs locally in a server space provided by the workflow facility. The workflow action (e.g., a default object called Task) is also sometimes extended by executable code for a custom action or custom activity. In some embodiments, the workflow action 202 is invoked by the workflow facility each time a step needs to be performed in association with a workflow model that the workflow facility is currently executing/performing. The workflow action 202 binds data (e.g., arguments) from existing input documents (e.g., XML documents) to some type of formal input, such as an input schema. In the vector-based workflow system, these input documents comprise collections of records (as opposed to single records used as inputs in most workflow applications). The formal input (e.g., in the form of a collection of records) can then be used in association with the workflow action 202 making a call to an adapter component 204 (or group of adapter components), which performs the actual work associated with the step from the workflow model. Communication between the workflow action 202 and the adapters 204 can take place through a firewall 208. The communication itself can be implemented, for example, using .Net remoting, with soap or Microsoft proprietary binary format, over TCP/IP. In an alternative embodiment, the adapter 204 may be exposed to the workflow action 202 as a web service.

Each call to an adapter contains a job request comprising a collection of task requests. Such task requests may specify operations to capture and bind documents to the workflow and to access the XML schema for such documents. Both job requests and task requests have parameters (e.g., composed of XML fragments). Accordingly, each adapter 204 is configured to handle both jobs (collections of tasks) and tasks (individual tasks). Each adapter 204 may be specific to a designated function. Examples of different types of adapters 204 include adapters for data capture, adapters for report generation, and adapters for information delivery (e.g., email adapter, fax adapter, SMS adapter, etc.). In some embodiments, each adapter 204 is hosted inside a unique Windows service. For example, a Service Control Manager (SCM) can be used to start or stop each adapter process. Each adapter 204 has two primary components, a connector proxy/data handler 212 and a device connector/data processor 214. The device connector/data processor 214 may be generic (i.e., the same across all adapters associated with the facility) except that it includes a unique task performer component 216, which provides the specialized task-processing capabilities associated with each adapter 204 (e.g., generate report vs. send batch email). The device connector/data processor 214, through the specialized task performer 216, is, thus, responsible for processing a specific type of individual task one task at a time.

The connector proxy/data handler component 212 of the adapter is responsible for processing all external requests at the job request level and managing an adapter database 206. For example, when a job request is received by an adapter 204, the connector proxy/data handler may be responsible for initially causing a job request and associated task requests to be stored in the adapter database 206 upon receipt, fetching a next task request from the adapter database 206, and calling the device connector/data processor 214 (which includes the specialized task performer 216) to process a task when appropriate. In this way, the task performer 216 may receive both job parameters and task parameters each time a task is processed.

Because it is not itself required to conduct processing in association with specialized tasks, the connector proxy/data handler 212 may be generic. The connector proxy/data handler 212 may also be responsible for composing the final job result (to be returned to the workflow action) when all tasks for the job have been processed. In the meantime, the connector proxy/data handler 212 relies on the storage provided by the adapter database 206 while performing a job, so that it can store information as needed while the device connector/data processor 214 performs tasks associated with a job prior to the time when the individual task results can be compiled. In other words, job and task results may be stored in the adapter database 206 as they get computed, prior to being compiled and returned to the workflow action.

When more processing power is needed, a group of adapters 204 can be used to process task requests. In this case, all adapters 204 in the group point to the same adapter database 206. Load balancing occurs between all adapters 204 in the group. In some embodiments, an administrative user interface 210 enables managing adapters 204, adapter groups, and adapter configurations.

Figure 2:
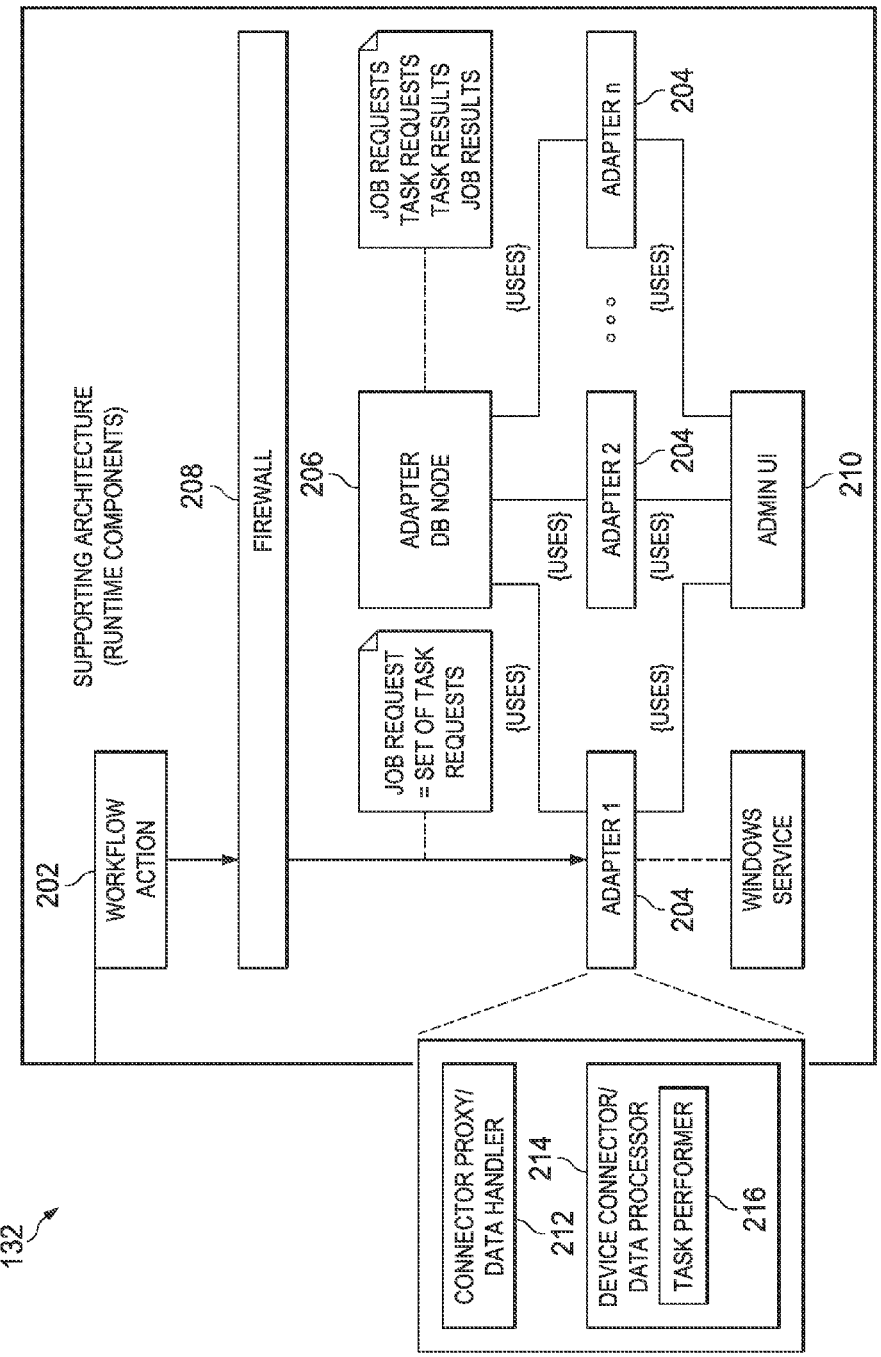
FIG. 2 is a block diagram showing an example implementation of a supporting architecture for implementing an embodiment of the workflow facility.
Figure 3:
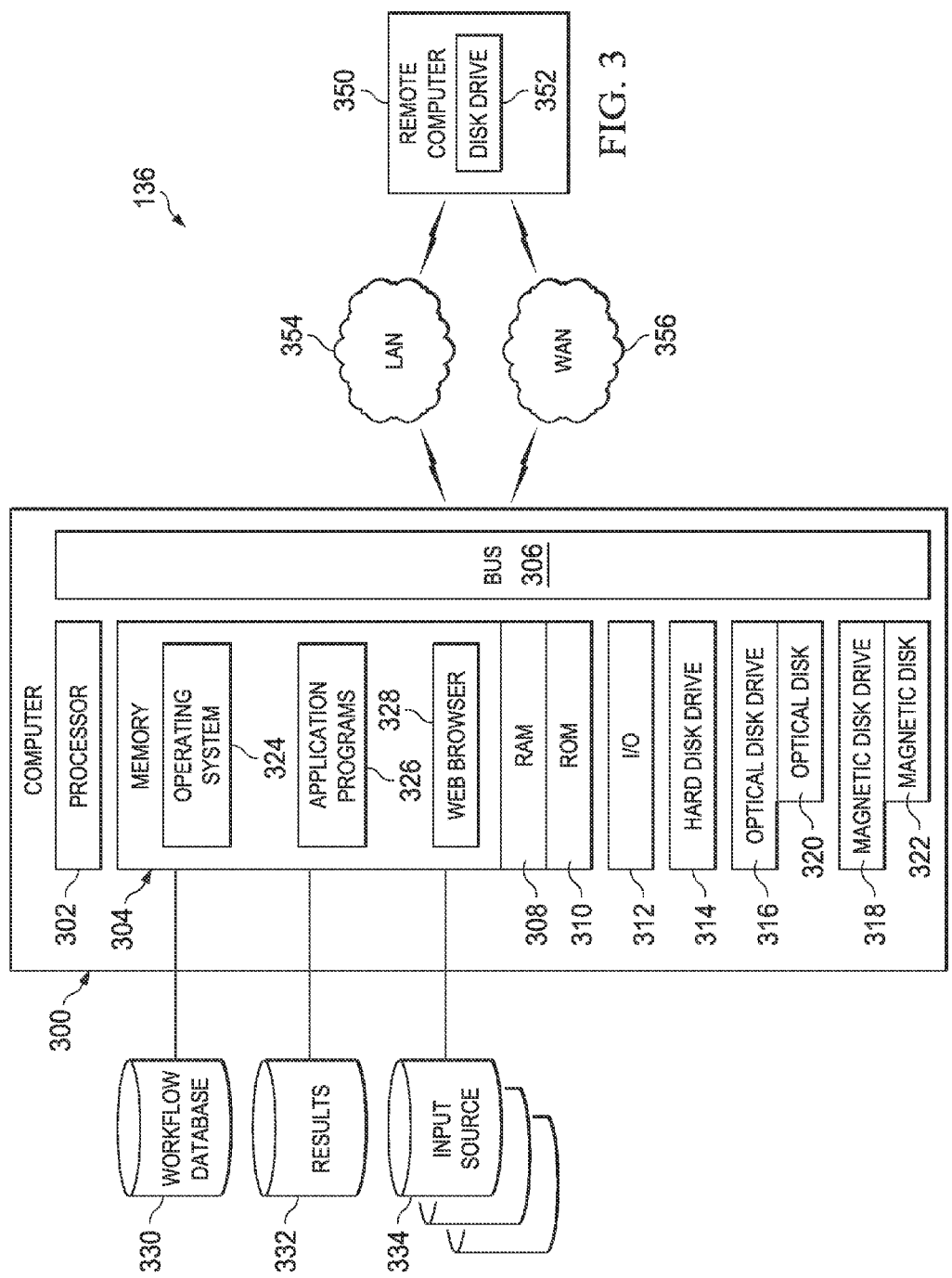
FIG. 3 is a block diagram showing more general computing components that can be used to implement the workflow facility of FIG. 1 and the supporting architecture of FIG. 2.

FIG. 3 is a block diagram showing more general computing components that can be used to implement the workflow facility of FIG. 1 and the supporting architecture of FIG. 2. Referring to FIG. 3, the general computing components that can be used to implement the workflow facility of FIG. 1 and the supporting architecture of FIG. 2 may include aspects of a conventional computer 300, which includes a processing unit 302, a system memory 304, and a system bus 306 that couples various system components including the system memory to the processing unit. The processing unit 302 may be any logic processing unit, such as one or more central processing units (CPUs), digital signal processors (DSPs), application-specific integrated circuits (ASIC), etc. Unless described otherwise, the construction and operation of the various blocks shown in FIG. 3 are of conventional design. As a result, such blocks need not be described in further detail herein, as they will be readily understood by those skilled in the relevant art.

The system bus 306 can employ any known bus structures or architectures, including a memory bus with memory controller, a peripheral bus, and a local bus. The system memory 304 includes random access memory ("RAM") 308 and read-only memory ("ROM") 310. A basic input/output system (I/O) 312, which can form part of the RAM 308, contains basic routines that help transfer information between elements within the computer 300, such as during start-up. The hardware elements of the input/output system 312 allow a user to enter commands and information into the computer 300 through input devices such as a keyboard, a pointing device such as a mouse, or other input devices including a microphone, joystick, game pad, scanner, etc. (all not shown). These and other input devices are connected to the processing unit 302 through an interface such as a serial port interface that couples to the bus 306, although other interfaces such as a parallel port, game port, or universal serial bus ("USB") can be used. For example, other hardware devices, such as a PCMCIA reader that receives a card, can be coupled to the interface. A monitor or other display device is coupled to the bus 306 via a video interface, such as a video adapter. The computer 300 can include other output devices, such as speakers, printers, etc.

The computer 300 also includes a hard disk drive 314 for reading from and writing to a hard disk (not shown), and an optical disk drive 316 and a magnetic disk drive 318 for reading from and writing to removable optical disks 320 and magnetic disks 322, respectively. The optical disk 320 can be a CD-ROM, while the magnetic disk 322 can be a magnetic floppy disk. The hard disk drive 314, optical disk drive 316, and magnetic disk drive 318 communicate with the processing unit 302 via the bus 306. The hard disk drive 314, optical disk drive 316, and magnetic disk drive 318 may include interfaces or controllers (not shown) coupled between such drives and the bus 306, as is known by those skilled in the art. The drives 314, 316, and 318, and their associated computer-readable media, provide nonvolatile storage of computer-readable instructions, data structures, program modules, and other data for the computer 300. Although the depicted computer 300 employs a hard disk, optical disk 320, and magnetic disk 322, those skilled in the relevant art will appreciate that other types of computer-readable media that can store data accessible by a computer may be employed, such as magnetic cassettes, flash memory cards, digital video disks ("DVD"), Bernoulli cartridges, ROMs, RAMs, smart cards, nanotechnology memory, etc.

Program modules can be stored in the system memory 304, such as an operating system 324 and other application programs 326, including various aspects of the workflow facility such as those described with respect to FIGS. 1 and 2. The system memory 304 may also include a web browser 328 for permitting the computer 300 to access and exchange data with web sites in the World Wide Web of the Internet, as described below. The application programs 326, including the workflow facility, may have access to one or more databases, which may be internal or external to the computer. For example, the workflow facility may have access to a workflow database 330 (which stores designed workflows/diagrams), a results database 332 (which stores results from executed workflows), and multiple input source databases 334.

The computer 300 can operate in a networked environment using logical connections to one or more remote computers, such as a remote computer 350. For example, the computer 300 may be involved in performing a first set of tasks in a workflow, and the remote computer 350 may be involved in performing a second set of tasks in the workflow. In another example, the remote computer 350 offers an input source for a workflow facility hosted at the computer 300. Likewise, the computer 300 may be involved in designing workflows having tasks to be performed by the remote computer 350. Like the computer 300, the remote computer 350 can be a personal computer, a server, a router, a network PC, a peer device, or other common network node, and typically includes many or all of the elements described above for the computer 300. Typically, the remote computer 350 includes a memory storage device such as a disk drive 352. The remote computer 350 is logically connected to the computer 300 under any known method of permitting computers to communicate, such as through a local area network ("LAN") 354 or a wide area network ("WAN") or Internet 356. Such networking environments are well known in offices, enterprise-wide computer networks, intranets, and the Internet.

In a LAN networking environment, the computer 300 is connected to the LAN 354 through an adapter or network interface (not shown) coupled to the bus 306. When used in a WAN networking environment, the computer 300 often includes a modem or other device for establishing communications over the WAN/Internet 356. In a networked environment, program modules, application programs, or data, or portions thereof, can be stored in the remote computer 350, such as in the disk drive 352. Those skilled in the relevant art will readily recognize that the network connections shown in FIG. 3 are only some examples of establishing communication links between computers, and other links may be used, including wireless links. In general, while hardware platforms, such as the computer 300 and the remote computer 350, are described herein, aspects of the invention are equally applicable to nodes on a network having corresponding resource locators to identify such nodes.

III. Vector-Based Workflow System

The workflow facility may be implemented as a vector-based workflow facility, where tasks can operate on more than one record at a time. For example, in a vector-based workflow facility, a single call to a data source retrieves a collection of records for repeatable processing, as opposed to a single record. In this way, each computation task within a workflow receives 0-N collections of records for processing as inputs at one time, and outputs 0-N records as output.

In some embodiments, the vector-based workflow facility further refines tasks as being comprised of two or more distinct components (e.g., a data handling component and a data processing component). For example, a data handling component may receive collections of data as input, manage the parsing of the collection of records into a set of single records, receive metadata parameters, manage queues of processing requests, and manage multiple instances of a data processing component. Thus, in general, the data handling component manages matters of scale for the vector-based workflow facility. On the other hand, the data processing component may perform a function on a given set of data. In this way, the data processing component does not incur the overhead of invoking multiple instances of a task. Instead, this responsibility is placed on the data handling component, which invokes multiple instances of the data processing component as needed.

Figure 4:
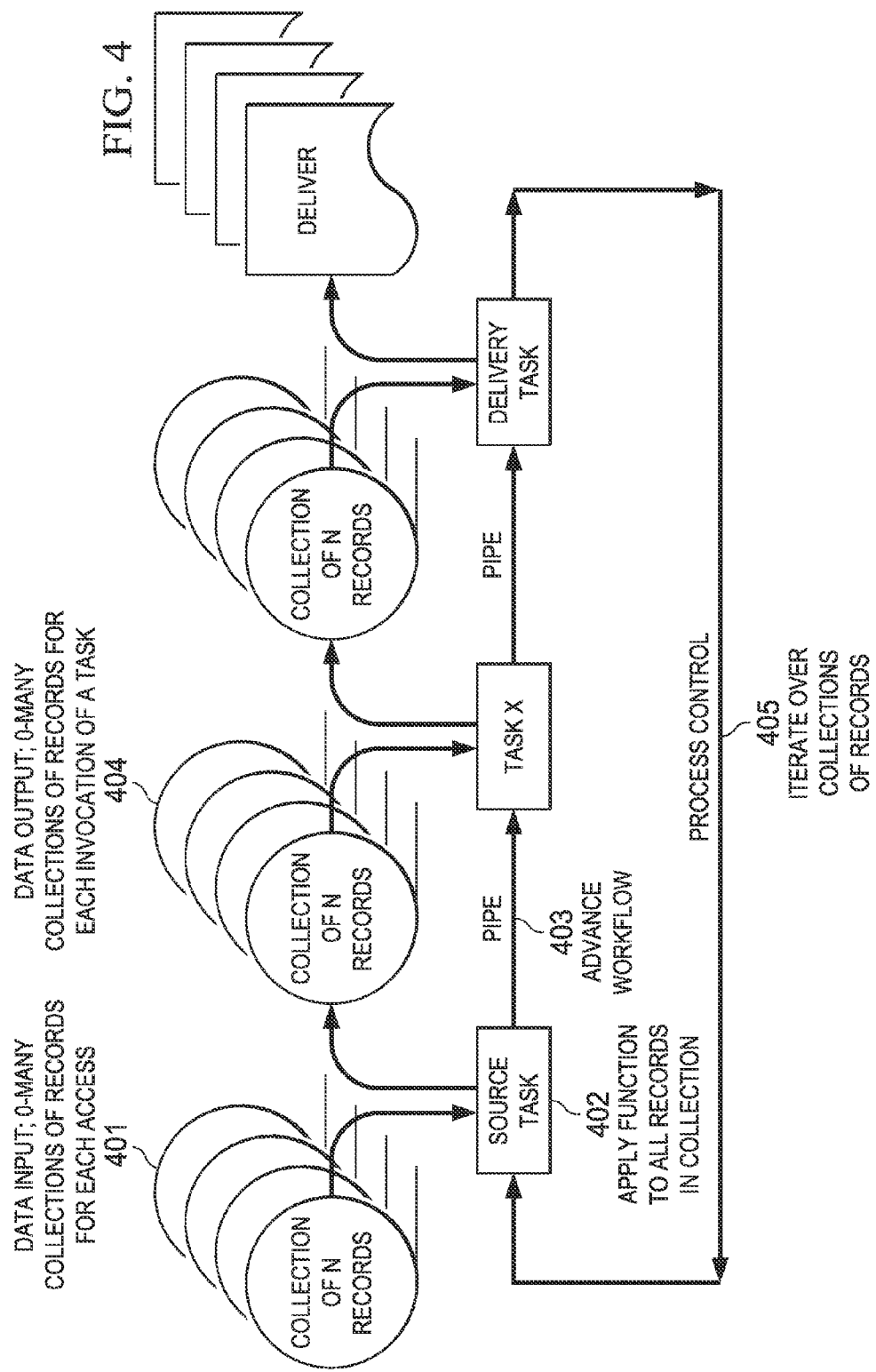
FIG. 4 is a data flow/block diagram showing aspects of assembling input data for use in a vector-based workflow facility.

FIG. 4 shows an example of a workflow iteration for a collection of retrieved records. At block 401, the facility (and more specifically the data handling component) reads in the input data one collection of records at a time (i.e., as a single input unit). Details of an example of this process are illustrated and described with respect to FIG. 5. Additional examples are illustrated and described with respect to FIGS. 7 and 8. At block 402, the facility applies a task to each record of data, prior to advancing to the next task. More specifically, the data handling component may invoke one or more instances of a data processing component to perform the task on each record in the collection. A more detailed example of this data processing action is illustrated and described with respect to FIG. 9. At block 403, the facility advances to apply the task to the next collection of records. Again, multiple instances of a data processing component may be invoked to perform this task. At block 404, the facility procures data output that results from performing the tasks. Details of an example of this process are illustrated and described with respect to FIG. 6, as well as FIGS. 7, 8, and 9. Like the data input, this data output may include a collection of records (as opposed to a single record). At block 405, the facility iterates over additional collections of records (if there is more than one collection of records to be acted on).

As demonstrated in the above example, the vector-based workflow facility supports collections and/or sequences of input data (as opposed to single records) and, hence, executes sequences of tasks for each invocation of that task. For example, while a more typical workflow system executes a task to send one email to one recipient list, the vector-based workflow facility sends a sequence of emails, each to its own recipient list. In other words, the vector-based workflow facility supports performing tasks with respect to sequences (including very large sequences). In this way, the vector-based workflow facility enables efficiencies in workflows and supports very high throughput delivery scenarios because the overhead of the workflow facility is kept to a minimum. The ability to identify and work on data that have common attributes, as described herein, can be tied to the use of specific resources in the computing environment as well. Another embodiment or application of the vector-based workflow facility described herein would be its use in conjunction with a simulation engine. The simulation engine may analyze a workflow application's overhead and/or identify potential runtime bottlenecks resulting from anticipated data handling. The simulation engine may then use the results of the analysis to set a threshold value or otherwise suggest the need for the use of vector-based operations to enhance system performance with workflow applications that are used to handle large volumes of documents or that perform operations on complex XML schema.

Figure 5:
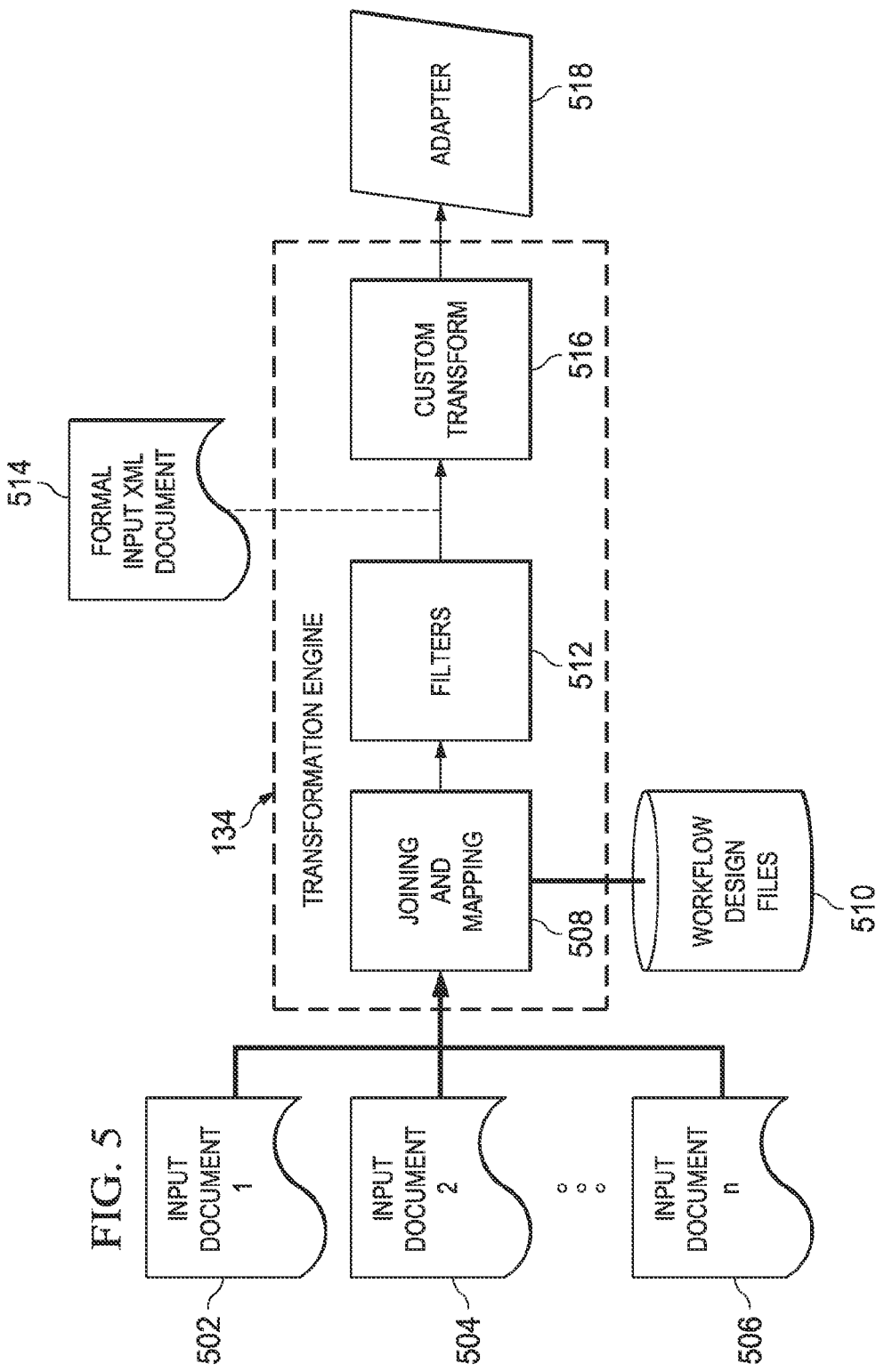
FIG. 5 is data flow/block diagram showing aspects of assembling output data resulting from processing in a vector-based workflow facility.
Figure 6:
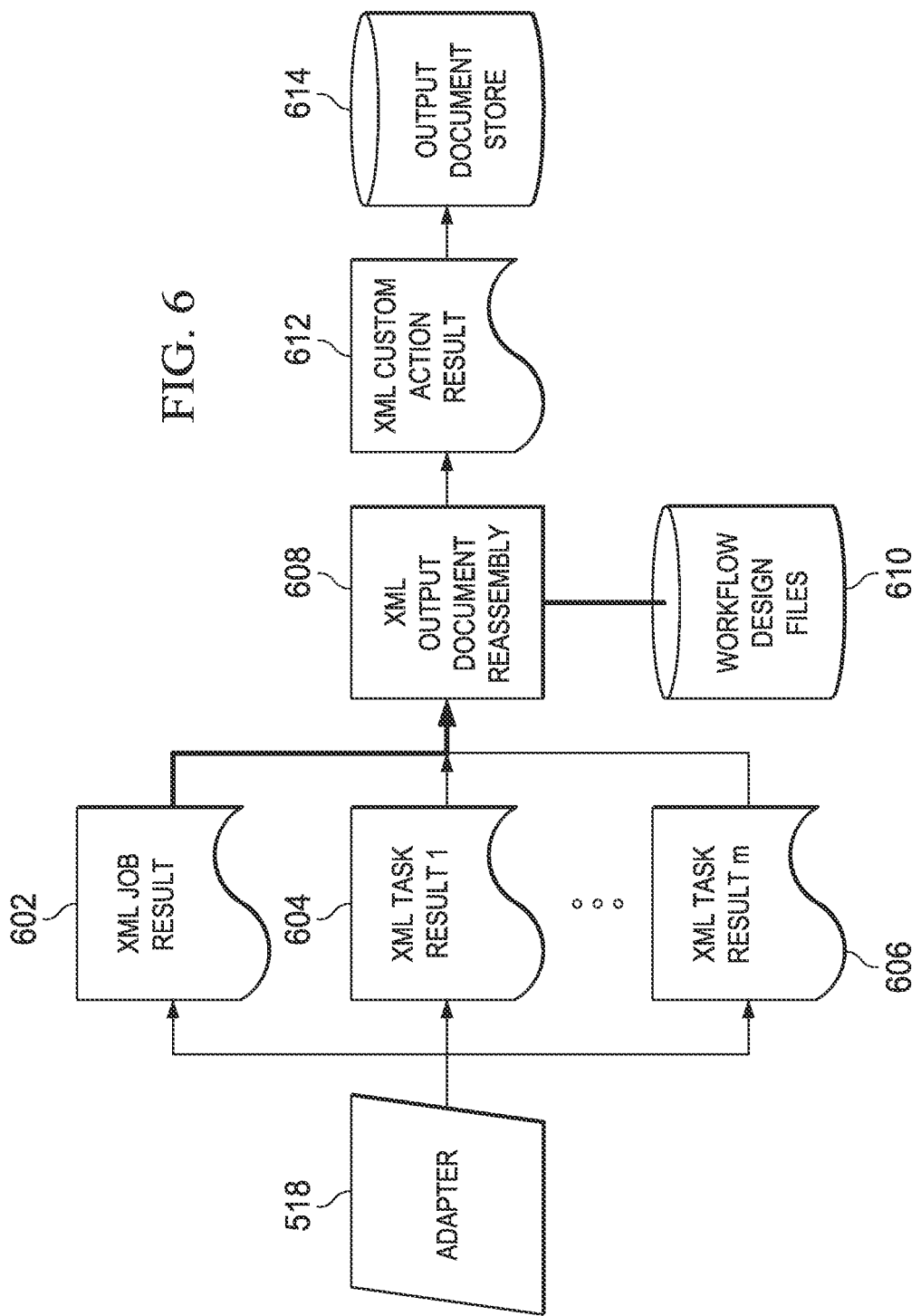
FIG. 6 is a data flow/block diagram illustrating an example of joining or merging data for use by a task of a workflow facility.

FIGS. 5 and 6 illustrate examples of actions performed by a vector-based workflow facility at runtime. For example, as illustrated in FIG. 5, in some embodiments, pre-processing occurs on input (e.g., XML input) to create a formal input document that a task may act on. More specifically, a joining and mapping functionality 508 may occur with respect to a sequence of input documents (502, 504, and 506). The joining and mapping functionality 508 may involve collecting additional input 510 from existing workflow design or input documents in a workflow design store. Additional details of the joining and mapping functionality 508 provided by the facility in some embodiments are described in more detail in commonly owned U.S. patent application Ser. No. 11/486,397, filed Jul. 12, 2006, entitled "COMPLEX DATA MERGING, SUCH AS IN A WORKFLOW APPLICATION." The result of the joining and mapping functionality 508 may be a single document 514 (e.g., an XML document) that comprises one or more tasks that match the formal input schema for an adapter 518. In addition to joining and mapping, this process may involve the use of filters 512 that limit the tasks and task data produced (e.g., do not send an invoice to customers who are being charged less than one dollar) and custom transforms 516 specified at design time that add an extensible and customizable mechanism to manipulate the task parameters prior to submission to the adapter (e.g., custom transformations may include almost any transformation or manipulation of the data that cannot be handled by either the joining itself or the filtering).

The joining and mapping functionality 508, the filters 512, and the custom transforms 516 may all be implemented in one or more transformation engines 134 of the supporting architecture 132 described with respect to FIG. 1. In general, during transformation, the data (e.g., XML data) from the formal input document 514 is broken down as job and task parameters and passed to the adapter 518 for processing. In this way, the adapter 518 has all the information it needs to perform the task passed to it. In some embodiments, the adapter is designed to be product-agnostic.

As illustrated in FIG. 6 after processing by the adapter 518, the workflow facility may collect task and job results (602, 604, and 606), and reassemble these resources into a single output document reassembly 608 (e.g., XML document). The single output document reassembly 608 may also incorporate information retrieved from one or more workflow design files 610. In some embodiments, not all tasks may result in the creation of output or results that is re-associated with the facility. However, in the illustrated embodiment, portions of the results are automatically extracted and persisted in a workflow storage system 614. A corresponding identifier may replace the actual content in a result 612 prior to storing.

In some instances, additional data may be associated with each task result even though the additional data may not be a part of the formal input or output schema of the adapter 518. For example, it may be desirable that each task result contain a unique identifier (e.g. InvoiceID) associated with the task result. The additional input may be part of the input document 502 used in the joining and mapping functionality 508. However, the formal output schema for the adapter may not contain this information. For example, if the output is an email report on users and invoices, that report may not contain an identifying key for the collection of documents as one of its fields. An output's identifying key may also be omitted in PDF or word processor files created to archive the reports. However, that additional data may be needed by the workflow application to track the data collection as a whole and to make sure that output of the adapter can be related back to the data collection by subsequent workflow tasks or to ensure that the system may later audit the performance of the workflow task. As part of the document reassembly 608, additional data not passed to the adapter may be recombined with the results and thus referenced at a later point in the workflow. This may be accomplished by associating the additional data with a unique identifier that will be output from the adapter in the task result.

IV. System Flows

Figure 7:
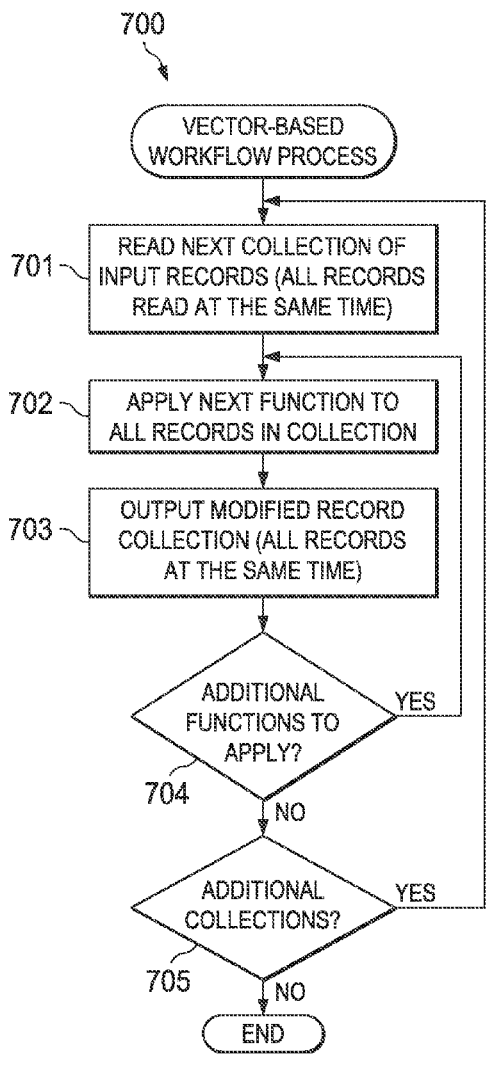
FIG. 7 is a flow diagram showing a high-level vector-based workflow process performed at the workflow facility.
Figure 8:
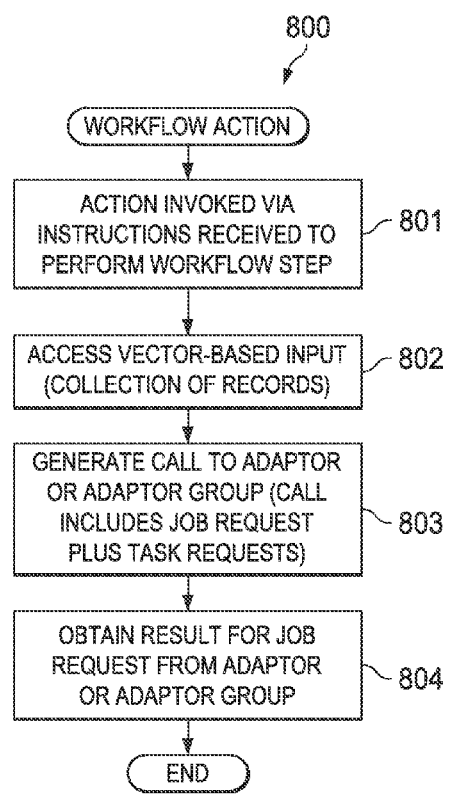
FIG. 8 is a flow diagram showing a routine performed by a workflow action utilizing vector-based data inputs to complete a step in a workflow model.
Figure 9:
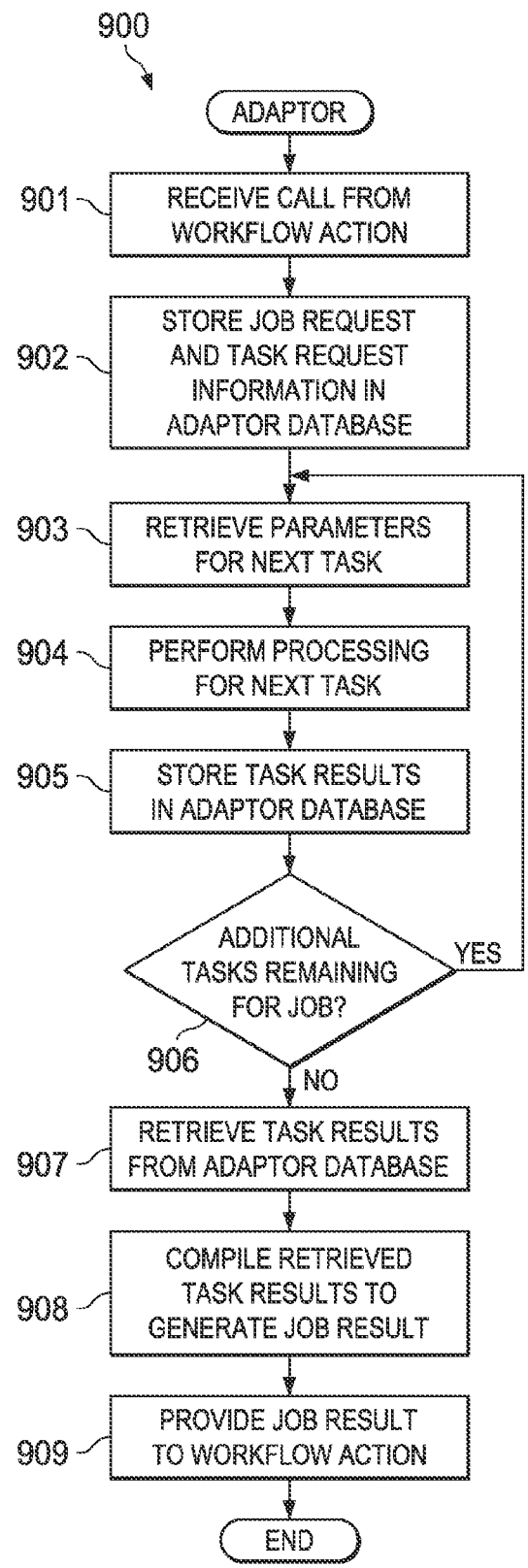
FIG. 9 is a flow diagram showing a routine performed by an adapter module in performing processing in association with vector-based data inputs used to complete a step in a workflow model.

FIGS. 7 through 9 are representative flow diagrams that show processes that occur within the system of FIGS. 1-3. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

FIG. 7 is a flow diagram showing a high-level vector-based workflow routine 700 performed at the workflow facility. The routine 700 is associated with a runtime environment in which the workflow facility executes a previously designed workflow model. In this example, the workflow model includes a series of linked steps or tasks that relate to a higher-level process. While the workflow facility does not require that all of the steps/tasks of an executed workflow model be automated, in the illustrated example, at least some of the steps or tasks of the workflow model are performed via some level of automated support from the workflow facility.

The routine 700 assumes that a particular step associated with the workflow model is ready to be performed, with the workflow facility playing a role in the performance of the step, so that the step can be performed automatically (or at least partially automatically). An example of such a step is a step to send an email to a group of customers. At block 701, the routine 700 reads a first collection of input records that is identified by the workflow model as being needed to performing the step from the workflow model. An example of such an input is a collection of records containing email information for the individual customers from the group of customers. The routine 700 reads the input records as a single unit of input (as opposed to one record at a time). In this way, pre-processing of the input information is minimized, despite the routine 700 being configured to handle a wide variety of input types, including collections of records that have records of more than one data format or data shape.

At block 702, the routine 700 applies, to all records in the collection of records, a function related to performing the step associated with the workflow model. A breakdown of block 702 (e.g., as performed by a workflow action associated with the workflow facility) is provided with respect to FIG. 8. An example of a function related to performing a step associated with a workflow model is a function used to generate an email for individual customers identified using a collection of records. At block 703, the routine 700 generates output resulting from applying the appropriate function to the collection of records (e.g., the routine 700 generates one or more documents containing a modified version of the collection of records). At decision block 704, the routine 700 determines whether additional functions relating to performing the step need to be applied to the record collection. If no further functions need to be applied, the routine 700 continues at block 705. However, if at decision block 704, further functions need to be applied, the routine 700 loops back to block 702 to apply the next function to all records in the collection of records. For example, the next function applied to the records in the collection of records may be a send email function, which sends out the emails generated by the first function. Tasks may also have multiple custom actions associated with them, and the program will loop through a task until all custom actions are completed.

At decision block 705, the routine 700 checks to see whether there are additional input units (e.g., collections of records) that need to be processed in association with performing the step from the workflow model. If so, the routine 700 loops back to block 701 to read the next collection of input records. If there are no further input units that need to be processed in association with performing the step from the workflow model, the routine 700 ends.

FIG. 8 is a flow diagram showing a routine 800 performed by a workflow action utilizing vector-based data inputs to complete a step in a workflow model. The routine 800 provides details for one example implementation of applying a function to a collection of records (block 702) of the routine 700 of FIG. 7. In some embodiments, the routine 800 is performed by a workflow action that runs in the workflow facility environment, such as the workflow action 202 of FIG. 2. This workflow action corresponds to a particular function associated with completing the step from the workflow model. Only a single invocation of the workflow action is needed to operate on an entire collection of records.

At block 801, the routine 800 invokes the workflow action via receipt of instructions to perform a workflow step. At block 802 the routine 800 accesses the vector-based input (e.g., after it has been read by the workflow facility as a collection of records, as described in block 701 of FIG. 7). At block 803 the routine 800 generates a call to an adapter or adapter group (such as the adapter(s) 204 of FIG. 2). This call includes a job request. The job request corresponds to a step associated with the workflow model, or alternatively, with a sub-step (e.g., function) associated with the step from the workflow model. The job request can be broken down into tasks (e.g., one task request for each record in the collection of records accessed at block 802). Thus, the job request is comprised of multiple task requests. The adapter or adapter group that is the subject of the call is configured for specialized processing to efficiently complete the job request (on a task-by-task basis) so that the function associated with the step from the workflow model can be completed. Additional details of how the adapter or adapter group performs job/task processing are provided with respect to FIG. 9. At block 804, the routine 800 obtains a compiled result for the job request from the adapter or adapter group. This information can then be used in association with completing (or proving completion) of the workflow model step. The routine 800 then ends.

FIG. 9 is a flow diagram showing a routine 900 performed by an adapter module (or group of adapter modules) in performing processing in association with vector-based data inputs used to complete a step in a workflow model. At block 901 the routine 900 receives a call from a workflow action, such as a call generated in block 803 of the routine 800 of FIG. 8). This call includes a job request (comprising multiple task requests, with each task request being associated with at least one record from a collection of records). At block 902, the routine 900 stores the job request and the task requests information received in the call of block 901 in an adapter database or other data store. At block 903, the routine 900 retrieves, from the adapter database, parameters for performing the next task. In reference to components of FIG. 2, blocks 901-903 may be performed by the connector proxy/data handler 212 of the adapter module.

At block 904, the routine 900 performs processing for the next task. At block 905, the routine 900 stores the results from the processing of the task in the adapter database or other data store. In reference to components of FIG. 2, the processing may be performed by the device connector/data processor 214 of the adapter. At decision block 906, the routine 900 checks to see whether the job includes additional tasks, which may be a function performed by the connector proxy/data handler 212 of FIG. 2. If there are additional tasks associated with the job, the routine 900 loops back to block 903 to retrieve, from the adapter database, the parameters for the next task. However, if there are no further tasks associated with the job, the routine 900 continues at block 907, where the routine 900 retrieves all the stored task results from the adapter database. At block 908, the routine 900 compiles the retrieved task results to generate a job result for the job request. At block 909, the routine 900 provides the compiled job result to the workflow action, as described with respect to block 804 of the routine 800 of FIG. 8. As with blocks 901-903, blocks 905-909 may be performed by the connector proxy/data handler 212 of the adapter module.

V. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above Detailed Description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments.

This application is related to commonly owned U.S. patent application Ser. No. 10/938,396, filed Sep. 10, 2004, abandoned, entitled "CUSTOM AND CUSTOMIZABLE COMPONENTS, SUCH AS FOR WORK FLOW APPLICATIONS"; commonly owned U.S. patent application Ser. No. 11/486,397, filed Jul. 12, 2006, entitled "COMPLEX DATA MERGING, SUCH AS IN A WORKFLOW APPLICATION"; and commonly owned U.S. patent application Ser. No. 10/938,118, filed Sep. 10, 2004, pending, entitled "USER-FRIENDLY DATA BINDING, SUCH AS DRAG-AND-DROP DATA BINDING IN A WORKFLOW APPLICATION." All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above description appears in text, the invention can be practiced in many ways. Details of the vector-based record handling techniques and associated workflow facility may vary considerably in their implementation details, while still be encompassed by the invention disclosed herein. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A system for processing records, the system comprising:
a computer executing a workflow application, the workflow application is configured for generating and executing workflow models, each of the workflow models comprises one or more steps, the workflow application includes a workflow action runtime component, an adapter component, and an adapter database;
the adapter component embodied on a non-transitory computer readable medium and configured to process a single input document generated by and received from a transformation engine, the single input document containing a list referencing multiple documents relating to input data to the transformation engine, the input data to the transformation engine comprises a collection of database records;
the workflow action runtime component runs in a runtime environment provided by the workflow application executing on the computer for performing a first step associated with a first workflow model that the workflow application is executing, the workflow action runtime component is configured to utilize the single input document in making a single call to the adapter component for performing repeatable processing on the input document associated with the first step from the first workflow model;
the adapter component is in communication with the workflow action runtime component and is configured to receive the call from the workflow action runtime component, the call includes a job request, the job request comprises multiple task requests, the call includes parameters associated with the job request and parameters associated with each of the multiple task requests, the parameters associated with each of the multiple task requests comprise XML fragments, the multiple task requests specify operations to apply to the list referencing multiple documents relating to the collection of database records, the adapter component computes the job request, one task at a time, responsive to the call to produce job and task results, the adapter component is one adapter runtime component from a group of adapter runtime components, the multiple task requests distributed among the group of adapter runtime components in a load-balancing scheme; and
the adapter database stores the job and task results as they are computed, prior to the job and task results being compiled and returned by the adapter component to the workflow action runtime component.

2. The system of claim 1, wherein collection of database records includes a first record from a first document and a second record from a second document.

3. The system of claim 1, wherein the adapter component includes a data handler configured for managing the job request and for managing the communication with the adapter database.

4. The system of claim 1, wherein the call includes an indication of the collection of database records in the form of one or more formal input schemas.

5. The system of claim 1, wherein the workflow action runtime component is further configured to bind data from the single input document to a formal input schema.

6. The system of claim 1, wherein the workflow action runtime component and the adapter component communicate through a firewall.

7. The system of claim 1, wherein the adapter component is one adapter runtime component from a group of adapter runtime components, and wherein each of the group of adapter runtime components performs a designated function.

8. The system of claim 1, wherein the adapter component is one adapter runtime component from a group of adapter runtime components, wherein the multiple task requests are distributed among the group of adapter runtime components in a load-balancing scheme to increase processing power, and wherein each of the multiple task requests is associated with a common function.

9. The system of claim 1, wherein each of the multiple task requests is associated with email sending.

10. The system of claim 1, wherein the adapter component and at least one additional adapter runtime component are in communication with the workflow action runtime component as an adapter runtime component group that shares the processing performed in association with completing the multiple task requests, and wherein each of the adapter runtime components in the adapter runtime component group is in communication with the adapter database.

11. The system of claim 1, wherein the list references multiple XML documents, each XML document comprising a single record.

12. The system of claim 1, wherein the operations bind the collection of database records to the first workflow model.

13. The system of claim 3, wherein the data handler of the adapter component is further configured for initially causing the job request and the multiple task requests associated with the job request to be stored in the adapter database.

14. The system of claim 3, wherein the data handler of the adapter component is further configured for reading in record collections one record collection at a time.

15. The system of claim 3, wherein the data handler of the adapter component is further configured to invoke one or more instances of a data processing component to perform a first task on all records in the collection of database records.

16. The system of claim 15, wherein the one or more instances of the data processing component operate to send a sequence of emails, each to its own recipient list.

* * * * *